Figure 1:
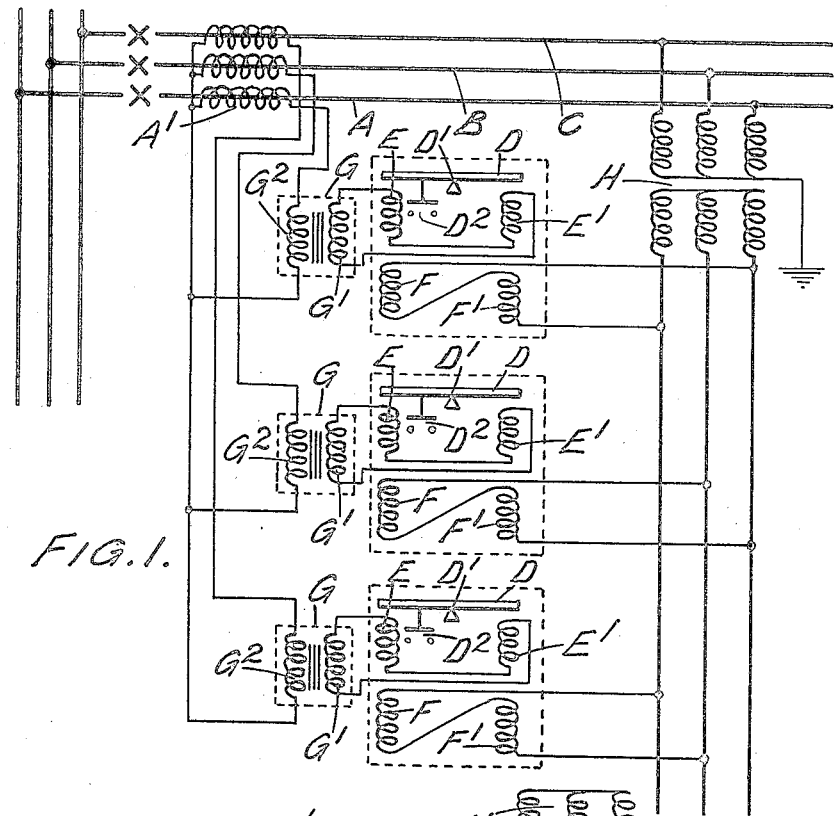

July 23, 1940.                H. LEYBURN ET AL                2,208,907
                      ALTERNATING CURRENT ELECTRIC RELAY
                           Filed Aug. 18, 1937           2 Sheets-Sheet 2
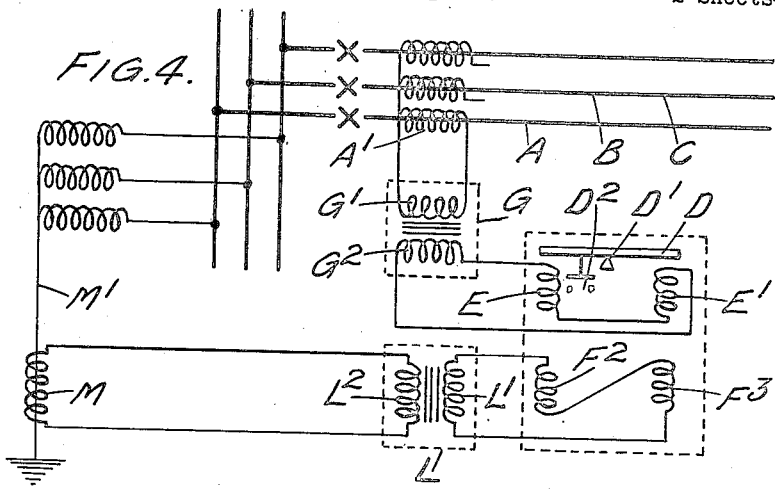
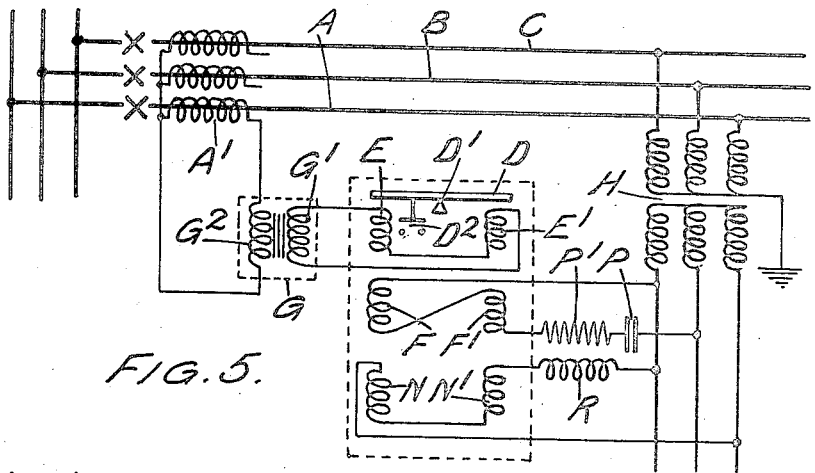
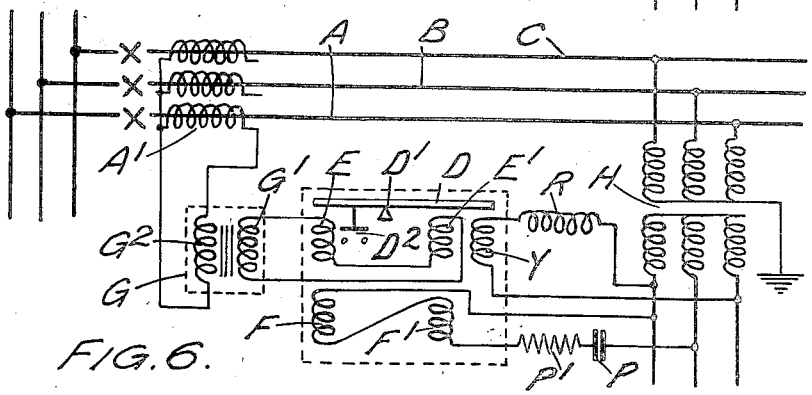

Patented July 23, 1940

2,208,907

UNITED STATES PATENT OFFICE 2,208,907

ALTERNATING CURRENT ELECTRIC RELAY

Henry Leyburn, Newcastle - upon - Tyne, and Charles Freeland, South Shields, England, assignors to A. Reyrolle & Company Limited, Hebburn-on-Tyne, England, a company of Great Britain Application August 18, 1937, Serial No. 159,786
In Great Britain July 22, 1937

15 Claims. (Cl. 175—294)

This invention relates to mechanically balanced alternating current electric relays comprising a movable contact member subject to two opposed forces dependent on quantities representative of quantities or characteristics of the main circuit or circuits with which the relay is associated. For reasons of clarity the word "characteristic" will be used herein to denote the main circuit quantity or characteristic (for example current or voltage), whilst the word "quantity" will be reserved for the quantity representative of the main circuit characteristic.

The invention is more particularly concerned with such relays in which at least one of the opposed forces is dependent on a vector resultant of two or more of the alternating quantities representing main circuit characteristics so as to give to the relay directional properties. Thus for example the two opposed forces may be respectively dependent on different vector resultants of two or more quantities representative of main circuit characteristics, for example the vector sum and vector difference of quantities representing a main circuit current characteristic and a main circuit voltage characteristic respectively. Thus the force produced by the vector sum of the quantities will be arranged to restrain the operation of the relay and that produced by the vector difference to tend to produce operation of the relay, so that an increase of current will in general increase the restraining force just as much as the operating force and operation of the relay will only occur when the current is reversed, the restraining force being then produced by the vector difference and the operating force by the vector sum of the quantities.

In relays of this kind the two opposed forces may be dependent partly on a main circuit characteristic which may increase greatly on the occurrence in the main circuit of fault or other conditions to which the relay is intended to respond, and partly on a main circuit characteristic which may not appreciably alter or may decrease on the occurrence of such conditions. When, as has been usual, the representative quantities are derived from the main circuit in such a manner that they are directly proportional to the main circuit characteristics, the value of one quantity may become so great compared to the other quantity that changes in the direction of one quantity relatively to the other, do not produce sufficient alteration in the value of the opposed forces to cause operation of the relay. Thus in the case, for example, of a directional relay of the kind described in U. S. Patent No. 2,063,477 in which one of the opposed forces is dependent on the vector sum and the other on the vector difference of two quantities respectively representing the voltage and the current in the main circuit, the increase in the current on the occurrence of a fault may be so great that the difference between the vector sum of the two quantities and their vector difference becomes relatively small. This is particularly so when, as frequently happens, the fault also causes a reduction or collapse in the voltage. In these conditions the response of the relay to a change in the direction of current flow in the main circuit may become unreliable.

The object of the present invention is to provide an improved relay of the kind referred to in which the above mentioned disadvantage is overcome.

According to the present invention a mechanically balanced directional alternating current electric relay comprises a movable contact member subjected to two opposed forces dependent on alternating quantities representative of main circuit characteristics, at least one of such forces being dependent on a vector resultant of two or more such representative quantities, and means for so controlling at least one of the latter quantities that, irrespective of relatively wide variations in the magnitude of the main circuit characteristic which it represents, the said quantity is always of substantially the same order of magnitude as another representative quantity.

For example the quantity in question may be so controlled that, irrespective of a relatively large increase in the magnitude of the main circuit characteristic which it represents, the said quantity cannot increase substantially beyond a predetermined value.

The two opposed forces may be respectively dependent on different vector resultants of two or more alternating quantities representative of main circuit characteristics. For example in one form the two opposed forces are respectively dependent on the vector sum and vector difference of quantities representing a main circuit current characteristic and a main circuit voltage characteristic respectively and means is provided for so controlling the quantity representing the said current characteristic that, irrespective of a relatively large increase of the current characteristic the said quantity cannot increase substantially beyond a predetermined value.

The means for controlling the magnitude of a representative quantity may comprise an impedance which varies with the voltage applied to it. For example a saturable choke coil may be shunted across a circuit through which a quantity to be controlled is supplied to the relay coils. Alternatively a representative quantity to be controlled may be supplied to the relay coils through a saturable transformer.

The relay may be provided with an additional coil or coils so arranged as to render the relay responsive to the impedance, reactance, or other distance characteristic of the main circuit. For example the further coil or coils may exert a restraining force and may be supplied with a quantity representative of the voltage of the main circuit.

The improved relay according to this invention is particularly suitable for use as a directional relay for protecting A. C. power supply systems, and three convenient forms of relay suitable for this purpose and applied to the protection of a three-phase A. C. circuit, will now be described by way of example with reference to the accompanying drawings, in which—

Figure 2:
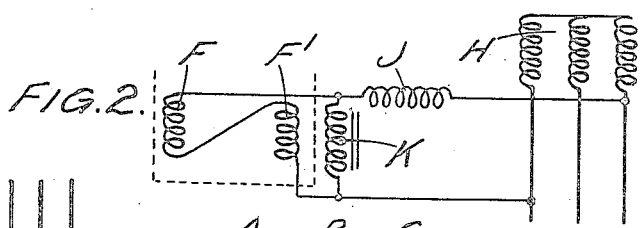
Figure 3:
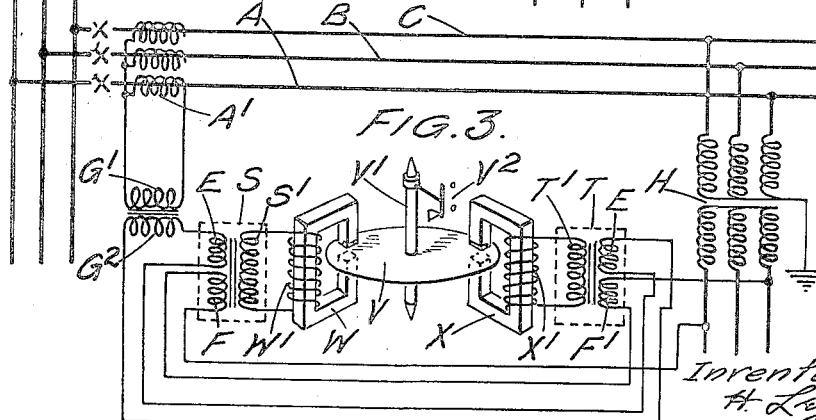

Figure 1 is a wiring diagram showing the connection to a three-phase power circuit of three relays respectively protecting the three phases, Figure 2 is a wiring diagram of part of the relay of Figure 1 showing a modified arrangement, Figure 3 is a diagram of a modified arrangement showing the relay for only one phase, and Figures 4, 5 and 6 are diagrams similar to Figure 3 of further modified arrangements.

In each of the arrangements shown in the figures each relay is employed for the directional protection of one phase of a three-phase feeder having phase conductors A, B and C. Thus in Figure 1 which shows the complete arrangement three of the relays are shown each serving for protection of one phase. Since the arrangements for the various phases correspond it will be sufficient to describe the uppermost relay serving for the protection of phase A. In Figures 3, 4, 5 and 6 for the sake of simplicity the relays for the other phases are not shown.

In the arrangement of Figure 1 the relay has two groups of coils arranged to exert opposed forces on a movable member consisting of a balanced beam D pivoted at $D^1$ and provided with contacts $D^2$ which are normally open and close when the relay operates, to effect the desired control operation, e. g., the tripping of a circuit-breaker. The control circuits are omitted from the drawings for the sake of simplicity. The two groups of coils are arranged to act on plunger type armatures (not shown) connected to the beam D on opposite sides of its pivot $D^1$ so that one group of coils (on the left of the pivot $D^1$ in the figures) exerts an operating force tending to close the relay contacts $D^2$ and the other group (on the right of the pivot $D^1$) a restraining force tending to hold the contacts open.

In the construction shown in Figure 1 there are two coils in each group, the coils E and F in the operating group and the coils $E^1$ and $F^1$ in the restraining group. The coils E and $E^1$ will, for convenience, be referred to as the current coils, as they are energized by a quantity representative of the current flowing in the protected circuit and the coils F and $F^1$ will be referred to as the voltage coils as they are energized by a quantity representative of the voltage.

The current coils E and $E^1$ are connected in series to the secondary winding $G^1$ of a saturable transformer G having its primary winding $G^2$ connected to the secondary winding $A^1$ of a current transformer in phase A of the protected circuit. It will be assumed that the arrangement of the phases A, B and C of the protected circuit is such that the current in phase B lags with respect to the current in phase A and the current in phase C leads with respect to the current in phase A.

The voltage coils F and $F^1$ are connected in series to the secondary winding of a star-connected potential transformer H so that they are energized in accordance with the voltage between the phases A and C. The voltage coils F and $F^1$ are connected and arranged with respect to the current coils E and $E^1$ in such senses that, assuming unit power factor and normal direction of power flow in the protected circuit, the current flowing in the current restraining coil $E^1$ leads that flowing in the voltage restraining coil $F^1$ by 30° so that these two currents produce fluxes, the vector sum of which acts on the beam in a restraining direction tending to hold the contacts open. The current operating coil E is connected in the opposite sense to the corresponding restraining coil $E^1$ so that the currents flowing in the two operating coils E and F are 150° phase displaced and the operating force depends on the vector difference of the two fluxes produced by the currents flowing in the operating coils. Thus when power is flowing in the normal direction in the protected circuit the relay is maintained in its inoperative position with its contacts open.

When the direction of power flow in phase A of the protected circuit is reversed, the direction of current flow in the current coils $EE^1$ of the relay reverses with respect to the direction of current flow in the voltage coils $FF^1$ so that the operating force becomes greater than the restraining force, and the relay operates to close its contact.

The saturable transformer G through which the current coils of the relay are supplied acts to limit the current flowing in these coils to a value such that its order of magnitude is not altered by a large increase in the current flowing in phase A. For example the saturable transformer G may be so chosen that, with normal load current flowing in phase A, the transformer core is nearly saturated. Under these conditions the current supplied from this transformer to the relay coils $EE^1$ will increase only a relatively small amount when there is a heavy overload current such as may flow on the occurrence of a fault.

Although not esential the energizing current of the voltage coils of the relay may also be controlled so as to modify the reduction in the voltage across the relay coils when owing to a fault, there is a large fall in the voltage between phases A and C. In such a modified arrangement which is shown in Figure 2, a resistance or inductance J is connected in series between the voltage coils F, $F^1$ and the potential transformer H and a saturable choke coil K is connected across the latter coils, the characteristics of the choke coil being such that it is saturated under normal conditions and, when saturated, has an impedance which is low compared to the combined impedance of the relay coils $FF^1$. When the line voltage decreases the voltage applied to the choke coil K decreases so that it is no longer saturated and its inductance increases. The consequent increase in the impedance of the part of the circuit comprising the relay coils $FF^1$ and the choke coil K relatively to the impedance of the series resistance or inductance J, alters the relative voltage drops in the circuit in such a manner that there is a greater proportion of the total available voltage across the relay coils $FF^1$, i. e., the percentage decrease in the voltage drop across the relay coils is less than the percentage decrease in the main voltage.

The current flowing in the voltage coils $FF^1$ of the relay can thus be maintained at substantially the same order of magnitude even when there is a relatively large fall in the voltage between phases A and C. For example by suitable selection of the impedances of the series resistance or inductance J and the choke coil K with reference to the impedance of the relay coils $FF^1$, the arrangement may be such that when the line voltage falls to, say, 10% of its normal value, the voltage drop across the relay coils only falls to 33⅓% of its normal value.

The other two relays for protection of phases B and C are arranged in the same manner as that for protection of phase A.

Whilst in Figure 1 the movable members of the relays are illustrated as balanced beams they may if desired be of induction disc or other suitable type.

Whilst the relays are referred to herein as having groups of coils to which the various representative quantities are supplied it is to be understood that any suitable equivalent arrangement may be employed. Thus for example various representative quantities may be supplied to windings on summation transformers having secondary windings from which the relay is energised, or two or more quantities which combine to produce the opposed forces may be injected into energizing circuits for two opposed coils acting on the relay contact member, in any suitable manner.

Thus Figure 3 shows an arrangement in which an induction type relay is energised through a pair of summation transformers. In this case the windings E and F are constituted by a pair of primary windings on a transformer S whilst the windings $E^1$ and $F^1$ are constituted by a pair of primary windings on a transformer T. The relay comprises an induction disc V the spindle $V^1$ of which carries a contact member adapted to close contacts $V^2$ corresponding to the contacts $D^2$ in Figure 1. The secondary winding $S^1$ of the transformer S is connected to a winding $W^1$ on a core W having shaded poles cooperating with the induction disc so as to tend to turn it in one direction. Similarly the secondary winding $T^1$ of the transformer T is connected to a winding $X^1$ on a core X also having shaded poles cooperating with the induction disc and arranged so as to tend to turn the disc in the opposite direction. The operation of this arrangement is similar to that of the arrangement shown in Figure 1 and it is considered unnecessary to describe it in greater detail.

The construction of relay shown in Figure 4 is generally similar to the construction shown in Figure 1 from which it differs only in the way in which the "voltage coils" are energised. This construction of relay is intended for use as a directional earth-leakage relay when a neutral earthing connection of the protected system is accessible. Accordingly the current coils $EE^1$ are energised from phase A of the protected section as in the first construction, whilst the voltage coils $F^2F^3$ are connected in series (in the appropriate sense to obtain the desired sum and difference effect referred to above) to the secondary winding $L^1$ of a saturable transformer L having its primary winding $L^2$ connected to a current transformer M in the neutral connection $M^1$. If an earth connection is not available, the current transformer can be arranged in a connection between earth and the star point of a three-phase star-connected resistor or reactor. The relay operates to close its contacts when there is an earth-fault current and at the same time a reversal in the direction of the current flowing in phase A of the protected circuit. The saturable transformers G and L ensure that the quantities representative of the phase current and earth-fault current are of substantially the same order of magnitude irrespective of wide variations in the corresponding main circuit characteristics so as to ensure reliable operation of the relay even when, say, the earth leakage current is very large and the phase current very small or vice versa.

In the construction shown in Figure 5 there are three coils in each of the groups of coils acting on opposite sides of the relay beam. Two coils E, F or $E^1$, $F^1$ of each group are the current and voltage coils as in the construction shown in Figure 1 whilst the third coil N or $N^1$ in each group is a coil which can be used to give the relay a further characteristic (in addition to its directional characteristic) as for example one dependent upon the impedance, reactance or other distance characteristic of the protected circuit.

In this relay the coils E, $E^1$ are connected in series with one another through the saturable transformer G to a current transformer in a selected phase of the protected circuit as in the first construction, the selected phase being phase A in the arrangement shown in Figure 5. The voltage coils F, $F^1$ are, however, connected in series with one another and in the appropriate sense to the secondary winding of the star-connected potential transformer H so that they are energised in accordance with a quantity dependent upon the voltage between the other two phases of the circuit, i. e. the voltage between phases B and C. These coils are thus energised by a quantity derived from a voltage in quadrature with the current in phase A. A condenser P and a resistance $P^1$ are connected in series with the voltage coils F, $F^1$ so that the current in these coils leads the applied voltage by an angle of less than 90°. The restraining force is then dependent on the vector sum of the fluxes produced by the coils $E^1$, $F^1$ and the operating force on the vector difference of the fluxes produced by the coils E, F.

As thus far described this relay is generally similar to the first construction with the exception that the quantity representative of the voltage is dependent on the voltage between phases B and C instead of between phases A and C. This arrangement has the practical advantage that, whereas the voltage between phases A and C usually decreases considerably on the occurrence of a fault on phase A, particularly when this fault is a phase-fault between phases A and C, the voltage between phases B and C will probably not alter to any great extent. If desired the quantity supplied to the voltage coils F and $F^1$ may be controlled in the manner shown in Figure 2 in order to reduce the decrease in the voltage across the relay coils in the event of a large decrease in the voltage between phases B and C due, for example, to an interphase fault between all three phases of the protected circuit.

The third coils $NN^1$ in the two groups, which for convenience are hereinafter referred to as the impedance coils, are connected in series with one another and with an inductance R to the secondary windings of the potential transformer H in phases A and C so that the impedance coils $NN^1$ are energised by a quantity representative of the voltage between phases A and C. The impedance coils $NN^1$ are wound and connected in the same sense as the current coils $EE^1$ so that the forces on the two sides of the beam D due to the interaction between the current and impedance coils both depend on the vector sum of the fluxes produced and therefore balance one another under all conditions.

Since the current and voltage coils $EE^1$ and $FF^1$ interact, as described above, to provide the directional feature of the relay owing to the force on one side of the beam D being due to the sum of the quantities and the force on the other side to the difference, there must be a similar interaction between the impedance coils $NN^1$ and the voltage coils $FF^1$. As however there is no change in the relative directions of the currents flowing in the voltage and impedance coils, since the relative directions of the phase voltages from which these currents are derived do not change, the impedance coils $NN^1$ can be so connected relatively to the voltage coils $FF^1$ that the force due to the vector sum of the fluxes produced by these coils always acts on the restraining side of the beam D whilst the force due to the vectorial difference of these fluxes acts on the operating side of the beam, the coils being so arranged that the vector sum of these fluxes is greater than their vector difference. The impedance coils thus always exert a restraining force tending to keep the contacts $D^2$ open. However in the event of a fault between phases A and C there is a collapse in the voltage between these phases so that the current flowing in the impedance coils $NN^1$ becomes very small and there is a corresponding decrease in the restraining action of the impedance coils.

The restraint due to the interaction between the voltage and the impedance coils is thus a measure of the voltage between phases A and C. On a reversal of power current flow in phase A, the current required to operate the relay depends upon the value of the restraint and, as will be appreciated from the above description, is less the lower the restraint. The relay thus has a distance characteristic, that is, does not operate unless a ratio generally representative of the fault distance is below a predetermined value.

The arrangement shown in Figure 6 is similar to that shown in Figure 5 except that instead of the two coils N and $N^1$ one acting on each side of the beam, a single coil Y energised in accordance with the voltage between phases A and C is arranged to act on the beam, preferably on a separate armature attached thereto, in a restraining direction.

Whilst it is generally possible so to arrange an induction disc or dynamometer type directional relay of the usual type that a large increase in one quantity relatively to another improves the operation of the relay, it is essential in a relay of the mechanically balanced type (irrespective of whether its movable contact member is of the induction disc or beam type), which depends for its operation on the difference between the sum and difference of two quantities, that, for reliable operation of the relay, the two quantities should not differ in magnitude to such an extent that the larger quantity tends to "swamp" the effect of changes in magnitude and/or direction of the smaller one. It will be readily appreciated from the above description that this essential condition is obtained in the improved mechanically balanced relay according to this invention.

Moreover in a directional relay of the ordinary induction disc type the change of one quantity (e. g., that representing current) necessary to operate the relay will be entirely dependent on the value of the other quantity (e. g., that representing voltage), whereas in a mechanically balanced relay, whether of induction disc or beam type, it is largely independent provided the quantities are of the same order of magnitude.

Although beam-type relays operate much more rapidly than induction disc type relays which are inherently slow in operation, it has not hitherto been practicable to use them as high speed directional relays owing to the risk of incorrect operation due to the "swamping" effect referred to above. The improved relay arrangement according to this invention has the important advantage that it enables beam-type relays to be used when a very high speed directional relay is required, e. g., capable of operating within one or two cycles of the A. C. supply.

A further advantage of the improved relay according to this invention is that by means of additional coils or the equivalent on the lines of the construction shown in Figure 5, it is possible to produce a relay having both a directional and a distance characteristic which is very much faster in operation than the induction relays which have hitherto been employed when characteristics of this type are required. Such a relay is particularly suitable as an initiating relay for an impedance or like protective system.

It will be appreciated that the above description is by way of example only and that various modifications may be made within the scope of the invention. It is also to be understood that, whilst in the constructions described above, saturable transformers or choke coils are used to control the magnitudes of the representative quantities, any other convenient form of variable impedance may be employed, e. g., resistances varying with temperature, or any other suitable form of control arrangement may be used.

What we claim as our invention and desire to secure by Letters Patent is:

1. A mechanically balanced directional alternating current electric relay, comprising a movable contact member, means for applying to the contact member opposed forces respectively dependent upon the sum and difference of two alternating quantities representative of main circuit characteristics, and means for so controlling, at least one of the said representative quantities that, irrespective of relatively wide variations in the magnitude of the main current characteristic which it represents, the said quantity is always of substantially the same order of magnitude as the other representative quantity.

2. A mechanically balanced directional alternating current electric relay, comprising a movable contact member, means for applying to the contact member opposed forces respectively dependent on a vector sum and vector difference of two quantities one of which quantities represents a main circuit current characteristic and another represents a main circuit voltage characteristic, and means for so controlling the quantity representing the said current characteristic that, irrespective of a relatively large increase of the current characteristic, the said quantity cannot increase substantially beyond a predetermined value.

3. A mechanically balanced directional alternating current electric relay, comprising a movable contact member, means for applying to the contact member opposed forces respectively dependent upon the vector sum and vector difference of two alternating quantities representative of main circuit characteristics, and means including a device having an impedance which varies with the voltage applied to it for substantially reducing variations of at least one of the said quantities consequent upon wide variations of the corresponding circuit characteristic which it represents, as compared with what such variations would be if the quantity were proportional to the main circuit characteristic.

4. A mechanically balanced directional alternating current electric relay, comprising a movable contact member, means for applying to the contact member opposed forces respectively dependent upon the vector sum and vector difference of alternating quantities representative of main circuit characteristics, and means including an electromagnetic device adapted to be saturated for so controlling at least one of the latter quantities that, irrespective of relatively wide variations in the magnitude of the main circuit characteristic which it represents, the said quantity cannot increase substantially beyond a predetermined value.

5. A mechanically balanced directional alternating current electric relay, comprising a movable contact member, means for applying to the contact member opposed forces respectively dependent upon the vector sum and vector difference of a plurality of alternating quantities representative of main circuit characteristics and means, including a transformer adapted to be saturated, for so controlling one of the said quantities that, irrespective of a relatively large increase of the main circuit characteristic which it represents, the said quantity cannot increase substantially beyond a predetermined value.

6. A mechanically balanced directional alternating current electric relay, comprising a movable contact member, means for applying to the contact member opposed forces respectively dependent upon the vector sum and vector difference of a plurality of alternating quantities representative of main circuit characteristics, whereof one quantity represents a main circuit current characteristic, and means including a transformer adapted to be saturated, for substantially reducing variations of at least one of the said quantities consequent upon wide variations of the corresponding circuit characteristic which it represents, as compared with what such variations would be if the quantity were proportional to the main circuit characteristic.

7. A mechanically balanced directional alternating current electric relay, comprising a movable contact member, means for applying to the contact member opposed forces respectively dependent on different vector resultants of a plurality of alternating quantities representative of main circuit characteristics, and means including a choke adapted to be saturated, for substantially reducing variations of one of the said representative quantities consequent upon wide variations of the corresponding main circuit characteristic which it represents, as compared with what such variations would be if the quantity were proportional to the main circuit characteristic.

8. A mechanically balanced directional alternating current electric relay, comprising a movable contact member, means for applying to the contact member opposed forces respectively dependent on different vector resultants of a plurality of alternating quantities representative of main circuit characteristics, whereof one quantity represents a main circuit voltage characteristic, and means including a choke adapted to be saturated for materially and continuously reducing variations of the latter quantity consequent upon wide variations of the main circuit voltage characteristic which it represents as compared with what such variations would be if the quantity were proportional to the main circuit voltage characteristic.

9. A mechanically balanced directional alternating current electric relay, comprising a pivoted beam type contact member carrying armatures, means for applying to the contact member by means of the armatures opposed forces respectively dependent on different vector resultants of a plurality of alternating quantities representative of main circuit characteristics, and means for materially and continuously reducing variations of at least one of the said quantities consequent upon wide variations of the corresponding circuit characteristic which it represents as compared with what such variations would be if the quantity were proportional to the main circuit characteristic.

10. A mechanically balanced directional alternating current electric relay, comprising an induction disc, a contact member connected thereto, means including two electromagnets both having shaded poles acting on the induction disc for applying to the contact member opposed forces respectively dependent on different vector resultants of a plurality of alternating quantities representative of main circuit characteristics, and means for materially and continuously reducing variations of at least one of the said quantities consequent upon wide variations of the corresponding circuit characteristic which it represents as compared with what such variations would be if the quantity were proportional to the main circuit characteristic.

11. A mechanically balanced directional alternating current electric relay, comprising a movable contact member, means for applying to the contact member opposed forces respectively dependent on different vector resultants of a plurality of alternating quantities representative of main circuit characteristics, whereof one quantity represents a main circuit distance characteristic, and means for materially and continuously reducing variations of at least one of the said quantities consequent upon wide variations of the corresponding circuit characteristic which it represents as compared with what such variations would be if the quantity were proportional to the main circuit characteristic.

12. A mechanically balanced directional alternating current electric relay, comprising a movable contact member, means for applying to the contact member opposed forces respectively dependent on different vector resultants of a plurality of alternating quantities representative of main circuit characteristics, whereof one quantity represents a main circuit current characteristic and two other quantities respectively represent different main circuit voltage characteristics, and means for materially reducing variations of at least one of the said quantities consequent upon wide variations of the corresponding circuit characteristic which it represents as compared with what such variations would be if the quantity were proportional to the main circuit characteristic.

13. A mechanically balanced directional alternating current electric relay, comprising a movable contact member, means for applying to the contact member opposed forces respectively dependent on different vector resultants of a plurality of alternating quantities representative of characteristics in a three-phase main circuit, whereof one quantity represents the current in one phase and another represents the voltage between the other two phases, and means for materially and continuously reducing variations of at least one of the said quantities consequent upon wide variations of the corresponding circuit characteristic which it represents as compared with what such variations would be if the quantity were proportional to the main circuit characteristic.

14. A mechanically balanced directional alternating current electric relay, comprising a movable contact member, means for applying to the contact member opposed forces respectively dependent on different vector resultants of a plurality of alternating quantities representative of characteristics in a three-phase main circuit, whereof two quantities respectively represent two different interphase voltages of the main circuit, and another represents the current in a phase not common to the said voltages, and means for materially reducing variations of at least one of the said quantities consequent upon wide variations of the corresponding circuit characteristic which it represents as compared with what such variations would be if the quantity were proportional to the main circuit characteristic.

15. A mechanically balanced directional alternating current electric relay, comprising a movable contact member, means for applying to the contact member opposed forces respectively dependent on different vector resultants of a plurality of alternating quantities representative of characteristics in a three-phase main circuit, whereof one quantity represents the current in one phase and another represents the voltage between the other two phases, means for materially reducing variations of at least one of the said quantities consequent upon wide variations of the corresponding circuit characteristics which it represents as compared with what such variations would be if the quantity were proportional to the main circuit characteristic, and means for applying to the contact member a restraining force additional to the aforesaid opposed forces and dependent on a quantity representative of the voltage between the said one phase and one of the said other two phases.

HENRY LEYBURN.
CHARLES FREELAND.